May 7, 1968    A. J. TESTA ET AL    3,381,837

GASKET-FORMING COMPOSITIONS FOR CONTAINER CLOSURES

Filed Nov. 29, 1966

INVENTORS
ANTHONY J. TESTA
ROBERT D. ECKERT
BY
Metro Kalimon
ATTORNEY

United States Patent Office 3,381,837
Patented May 7, 1968

3,381,837
GASKET-FORMING COMPOSITIONS FOR
CONTAINER CLOSURES
Anthony J. Testa, Westwood, and Robert D. Eckert,
Arlington, Mass., assignors to W. R. Grace & Co., Cambridge, Mass., a corporation of Connecticut
Filed Nov. 29, 1966, Ser. No. 597,743
3 Claims. (Cl. 215—40)

ABSTRACT OF THE DISCLOSURE

Compositions for forming sealing gaskets in rotatable container closures which are composed of a plastisol of a vinyl resin and a minor amount of propylene glycol mono (12-hydroxy stearate). The stearate controls the torque which is required to remove the closure from a sealed container.

---

This invention relates to compositions suitable for use as gaskets in rotatable closure elements. In a particular aspect, it relates to sealing compositions containing an additive from which gaskets are formed in closures to provide them with improved removal torque values.

Rotatable closures are usually made of metal, such as lacquered tinplate or aluminum, and have gained extensive use in protecting and preserving foods in glass containers. To be effective, the closure requires a gasket to easily seal the contained food, and it must not include any deleterious substance that might transfer to and contaminate the food. Typical rotatable closures include the screw type and lug type, and they differ chiefly in the means by which the closure is held firmly in place on the container. Illustrative means include a continuous or discontinuous thread, projecting lugs, etc., located near the container opening; and they are adapted to mate in threaded engagement with the closure as it is rotatably advanced to bring the gasket into sealing relationship with the mouth of the container.

In sealing a container with a closure, air is exhausted from the headspace above the contents in closing machines which produces a vacuum either mechanically or by the condensation of steam. In closing the container, the torque must be sufficient to resist retractive movement during shipment and/or storage as such movement is apt to break the seal and cause leaks through which spoilage organisms can gain access to the contents in the container.

The torque which is required for closure removals on vacuum-packed containers varies widely, but it is well known that some containers have their caps so firmly secured that it is necessary to resort to fairly drastic means to effect their removal. On the other hand, a closure may be so loosely attached that only a slight twist is required to remove it from the container. This is objectionable because the container is subject to tampering while stored on shelves by customers who remove the closure to examine the contents and then replace the container on the shelf. It is apparent that such opening breaks the seal and exposes the contents to the atmosphere with the result that spoilage will gradually occur. Another objection is that a loosely-fitted closure may be accidentally jarred, causing the seal to be broken and concomitantly therewith result in exposure of the contents to contamination.

It is, therefore, an object of this invention to provide a composition which is suitable for use as a gasket in a rotatable closure which maintains a hermetic seal but has low removal torque requirements. This objective is achieved by incorporating propylene glycol mono(12-hydroxy stearate) as a torque control agent in the gasket-forming composition.

Closure manufacturers design their gaskets with the prime consideration of preventing accidental dislodgement of the closure. This requires formulation of the gasket-forming composition so that it exhibits considerable friction to the closure and the container against rotational torque. But, this is precisely what makes these closures difficult to open for the average consumer. By including propylene glycol mono(12-hydroxy stearate) in the gasket, the frictional forces which exist between the gasket and the container are appreciably reduced without impairing the sealing efficiency.

Plastisols are frequently used to form gaskets for closures. These compositions basically comprise a vinyl resin dispersed in a plasticizer in which the resin is insoluble at room temperature but which is capable of solvating the resin at an elevated temperature. The properties of these compositions may be modified by the addition of conventional ingredients, such as fillers, stabilizers, pigments and other additives.

The propylene glycol mono(12-hydroxy stearate) which is included in the plastisol composition is largely incompatible with the resin and the plasticizer. It is possessed of limited compatibility, however, so that it remains essentially within the body of the gasket when it is relaxed or uncompressed. However, a portion of the stearate exists as a thin film over the surface of the gasket. As the gasket is subjected to pressure when the closure is brought into sealing relationship with a container, an additional portion of the propylene glycol mono(12-hydroxy stearate) migrates to the surface of the gasket and thereby reduces the friction between the gasket and the lip of a container.

Figure 1:
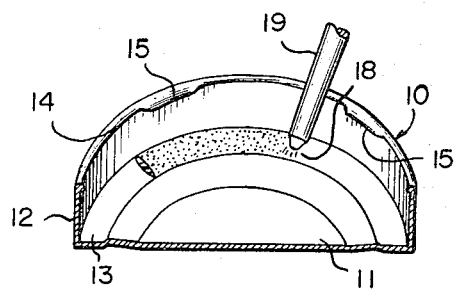
FIG. 1 is a perspective sectional view showing the application of a gasket-forming composition by means of a nozzle in the peripheral channel of an inverted closure.

The closure, shown generally at 10, comprises a circular panel 11 and a skirt 12 depending from the periphery of the panel. A gasket-receiving channel 13 is provided in the perimetrical margin of the panel adjacent the lower edge of the skirt. The upper edge of the skirt is curved inwardly to form a bead 14 into which are formed a series of spaced lugs 15. These lugs register with the thread 16 (shown in FIG. 2) formed on the neck of the container 17 and lock the closure in place.

Figure 2:
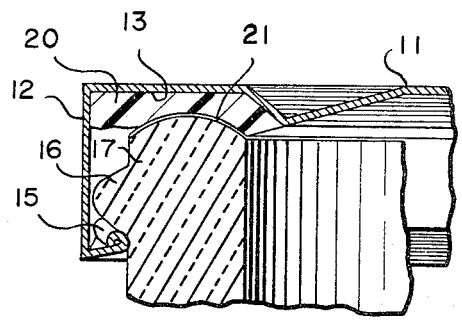
FIG. 2 is a fragmentary vertical sectional view of a closure in sealed relationship with a container.

The inner surface of the closure is usually coated with a protective film of a varnish or a lacquer, and the gaskets are generally formed from liquid compositions by a lining technique. In the lining operation (FIG. 1), the closure is positioned over a rotating chuck (not shown) and the composition 18 flows through a nozzle 19 into the channel 13. The closure is spun by the chuck, and the composition is distributed as a narrow band in the channel. The lined closures are then passed to a heated oven maintained at a temperature sufficiently high to flux the composition which, when cooled, solidifies to a permanent rubber-like gasket 20 (as shown in FIG. 2). The fluxing step is generally carried out by continuously advancing the lined closures through an oven on a wire mesh belt, and the advance is so synchronized that a residence time in the oven of about 60 seconds is sufficient to flux the composition.

In applying a gasketed closure to a container, the gasket surface has a thin film of the additive and as the closure is progressively advanced on the container, the increased pressure results in a corresponding increase in the exudation of additive to the surface. The greater the pressure the greater is the exudation, and migration of the additive continues until the closure is brought into sealing contact with the container. The surface layer of additive, shown as an exaggerated film 21 in FIG. 2, remains on the gasket so long as the sealing relationship is maintained. The additive thus acts as a lubricant by reducing the frictional forces which exist between it and the container and consequently, less torque is required to remove the closure. As the closure is progressively removed, the additive is gradually reabsorbed into the body of the gasket as the gasket is brought out of contact with the container.

Vinyl resin plastisols are particularly suitable for use in forming the gaskets. These include plasticized homopolymers of vinyl chloride and copolymers of vinyl chloride with up to 20% by weight of another monomer copolymerizable therewith. Suitable monomers include acrylonitrile, vinylidene chloride, vinyl acetate, and dialkyl maleates. Typical copolymers include 95 percent vinyl chloride–5% vinyl acetate; 95 percent vinyl chloride–5% dialkyl maleate; and 94 percent vinyl chloride–6% vinylidene chloride. The preferred resin is plasticized polyvinyl chloride.

The plasticizers which may be used in the gasket-forming compositions include dialkyl phthalates, alkyl phthalyl alkyl glycolates, dialkyl esters of alkane dicarboxylic acids, acetyl trialkyl citrates, and trialkyl and triaryl phosphates. Particular plasticizers include dioctyl phthalate (di-2-ethylhexyl phthalate), octyl decyl phthalate, ethyl phthalyl ethyl glycolate, butyl phthalyl butyl glycolate, diisobutyl adipate, dibutyl sebacate, acetyl dibutyl citrate, trioctyl phosphate and tricresyl phosphate. Other useful plasticizers include alkyl esters of fatty acids, such as octyl stearate; epoxidized triglycerides, such as epoxidized soybean oil; and polymeric polyester plasticizers, such as polymeric glycol adipate.

Various other additives may be included to modify the plastisol compositions. These include fillers, such as anhydrous calcium sulfate, talc, wood flour, diatomaceous earth and asbestos; stabilizers, such as tetrasodium pyrophosphate, tribasic lead silicate, calcium stearate, zinc stearate, dibasic lead stearate and organo-tin complexes; pigments, such as carbon black, titanium dioxide and aluminum powder; and dispersing agents such as zinc resinate, lecithin, glycol stearate, propylene glycol laurate and glycerol monooleate.

The propylene glycol mono(12-hydroxy stearate) is included in the gasket-forming composition in an amount sufficient to insure a proper balance of lubricating properties in the resulting gasket and will vary with the relative proportions and properties of the other components. In general, the amount should range between about 1 and 20, preferably between about 4 and 12, parts by weight per hundred parts of resin. Unless an excessive quantity is used, the amount that will migrate with time is negligible and the surface of the gasket will remain substantially tack-free.

Representative gasket-forming compositions containing propylene glycol mono(12-hydroxy stearate) are illustrated in Table I:

TABLE I

| Ingredient | Example No. (parts by weight) | | | | |
|---|---|---|---|---|---|
| | 1 | 2 | 3 | 4 | 5 |
| Polyvinyl chloride (disperison grade) | 60 | 60 | 60 | 100 | 60 |
| Polyvinyl chloride (suspension grade) | 40 | 40 | 40 | | 40 |
| Epoxidized soybean oil | 10.5 | 10.5 | 10.5 | 5 | 10.5 |
| Dioctyl phthalate | 51 | 63 | 51 | 70 | 51 |
| Barium sulfate | 100 | 100 | 100 | 100 | 100 |
| Titanium dioxide | | | 4 | | 4 |
| Lecithin | | 2 | | | |
| Propylene glycol mono(12-hydroxy stearate) (Paricin 9) | 4 | 7 | 8 | 8 | 12 |

1850 mgs. of the above compositions were deposited in the annular channel of a representative number of rotatable lug-type metal closures having a diameter of 63 mm. and then fluxed in an oven at a temperature of 400° F. and a residence time of one minute. The respective closures containing the fluxed gasket were placed on glass jars containing a representative pack of olives, jam and pickles. The olives were cold filled (75° F.) and steam closed. The jam was hot filled (200° F.) and steam closed. The pickles were cold filled (75° F.), steam closed and thereafter processed for 30 minutes in a bath of boiling water. The turndown torque to seal each container was 25 inch-lbs. which is customarily employed in commercial closure-applying machines. Each container was then stored for two weeks at a temperature of 100° F., and the closures were then tested for ease of removal. The results of the tests are shown in Table II.

TABLE II

| Composition of Example No. | Removal torques (inch-lbs.) | | |
|---|---|---|---|
| | Olives | Jam | Pickles |
| 1 | 100+ | 90 | |
| 2 | 51 | 60 | |
| 3 | | 90 | 73 |
| 4 | 50 | 60 | |
| 5 | | 80 | 60 |

Gaskets formed from identical compositions which did not include propylene glycol mono(12-hydroxy stearate) required a removal torque of well over 100 inch-lbs. On the other hand, it is noted from Table II that the addition of propylene glycol mono(12-hydroxy stearate) provided relatively low removal torques. This is significant in that the frictional forces between the gasketed closure and a container are reduced without adversely affecting the seal. It has also been observed that the addition of the ester to the composition did not cause corrosion of the metal closure nor cause objectionable staining of the gasket. A further advantage resulting from the addition of the ester to the composition is that adhesion of the gasket to the metal closure was excellent, and no lifting of the gasket resulted when the closure was removed from the container.

The removal torques are progresively lowered when the propylene glycol mono(12-hydroxy stearate) is increased from 4 to 12 parts by weight per hundred parts by weight of resin. However, the amount should not exceed 20 parts per hundred parts by weight of resin because quantities in excess of this amount result in a loosely-fit closure.

We claim:
1. A closure comprising a cap adapted to be rotatably attached to a container opening and a rubber-like gasket positioned in the cap to register in sealing relationship with the lip of the container, said gasket comprising a fluxed plastisol of a vinyl chloride resin containing between about 1 and 20 parts by weight of propylene glycol mono(12-hydroxy stearate) based on 100 parts by weight of the resin.

2. A closure according to claim 1 wherein the stearate is present in amounts ranging between 4 and 12 parts by weight.

3. A closure according to claim 1 wherein the resin is polyvinyl chloride.

References Cited

UNITED STATES PATENTS

| 2,902,500 | 9/1959 | Smith | 260—31.6 |
| 2,528,506 | 11/1950 | Foye | 260—31.6 |
| 2,580,460 | 1/1952 | Patton | 260—31.6 |
| 2,514,424 | 7/1950 | Smith | 260—322 |
| 2,357,833 | 9/1944 | Kropscott | 260—323 |
| 3,142,401 | 7/1964 | Foss. | |
| 2,874,863 | 2/1959 | Unger. | |

OTHER REFERENCES

Knight: American Oil Chemists Soc., September 1958, vol. XXXVI, No. 9, pp. 382–388.

JULIUS FROME, *Primary Examiner.*